(12) United States Patent
Morgan et al.

(10) Patent No.: US 11,093,588 B2
(45) Date of Patent: Aug. 17, 2021

(54) MEMORY SYSTEM INCLUDING DATA OBFUSCATION

(71) Applicant: Micron Technology, Inc., Boise, ID (US)

(72) Inventors: Donald M. Morgan, Meridian, ID (US); Joseph C. Sher, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 91 days.

(21) Appl. No.: 15/633,045

(22) Filed: Jun. 26, 2017

(65) Prior Publication Data

US 2018/0373850 A1 Dec. 27, 2018

(51) Int. Cl.
G06F 21/14 (2013.01)
G06F 12/14 (2006.01)
G06F 21/62 (2013.01)

(52) U.S. Cl.
CPC ............ *G06F 21/14* (2013.01); *G06F 12/145* (2013.01); *G06F 21/6245* (2013.01)

(58) Field of Classification Search
CPC ....................................................... G06F 21/14
See application file for complete search history.

(56) References Cited

U.S. PATENT DOCUMENTS

| | | | | |
|---|---|---|---|---|
| 9,117,094 | B2* | 8/2015 | Anckaert | G06F 21/79 |
| 10,404,674 | B1* | 9/2019 | Bshara | H04L 9/0894 |
| 2005/0114610 | A1* | 5/2005 | Robinson | G06F 21/71 |
| | | | | 711/152 |
| 2007/0033417 | A1* | 2/2007 | Gammel | H03M 13/116 |
| | | | | 713/189 |
| 2007/0101158 | A1* | 5/2007 | Elliott | G06F 21/79 |
| | | | | 713/193 |
| 2014/0115292 | A1* | 4/2014 | Mclachlan | G06F 12/02 |
| | | | | 711/170 |
| 2015/0234751 | A1* | 8/2015 | Van Der Sluis | H04L 9/0866 |
| | | | | 713/193 |
| 2017/0147509 | A1* | 5/2017 | Nevers | G06F 21/552 |
| 2018/0373850 | A1* | 12/2018 | Morgan | G06F 12/145 |
| 2019/0042362 | A1* | 2/2019 | Bolotov | H03M 13/1102 |

* cited by examiner

*Primary Examiner* — Harris C Wang
(74) *Attorney, Agent, or Firm* — Schwegman Lundberg & Woessner, P.A.

(57) ABSTRACT

Data obfuscation is generally discussed herein. In one or more embodiments, a memory circuit can include a storage portion including entries with corresponding addresses, one or more of the entries configured to include data stored thereon, and processing circuitry to read first data from a first entry of the entries, alter the first data by at least one of: (1) flipping one or more bits of the first data, (2) scrambling two or more bits of the first data, and (3) altering an address of the first data, and write the altered first data to the storage portion.

25 Claims, 6 Drawing Sheets

MEMORY SYSTEM INCLUDING DATA OBFUSCATION

BACKGROUND

Information, including sensitive information, may be stored in computer memory. Sensitive information may include personal, private, or other information that a person does not want another person to have or have access to. Sensitive information may include a credit card number, social security number, financial information (bank account numbers, investment account information, or the like), password(s), emails, documents, pictures, videos, or the like. A bad actor may try to steal information from the memory even if the memory is powered off or being powered off.

DESCRIPTION OF THE EMBODIMENTS

The following detailed description refers to the accompanying drawings which show, by way of illustration, specific aspects and embodiments in which the present subject matter may be practiced. These embodiments are described in sufficient detail to enable those skilled in the art to practice the present subject matter. The following detailed description is not to be taken in a limiting sense, and the scope of the present invention is defined only by the appended claims, along with the full scope of equivalents to which such claims are entitled.

Figure 1:
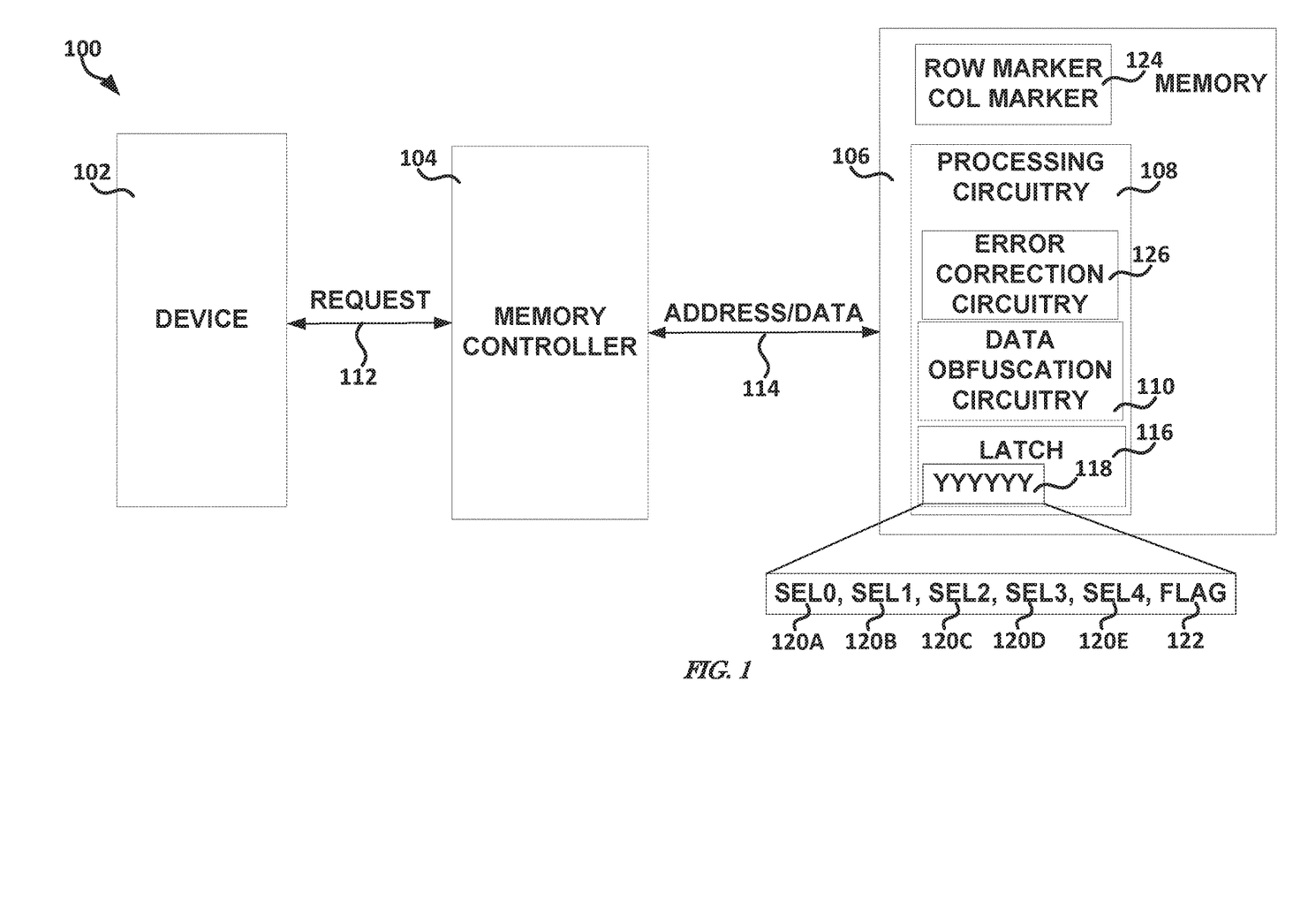
FIG. 1 illustrates, by way of example, a block diagram of an embodiment of a system.

FIG. 1 illustrates, by way of example, a block diagram of an embodiment of a system 100. The system 100 may be configured to obfuscate information stored on a memory 106. The data obfuscation may help prevent a bad actor from using the information stored on the memory 106. The system 100 as illustrated includes a device 102, a memory controller 104, and a memory 106. The memory controller 104 and the memory 106 are illustrated as being separate from the device 102, however, in one or more embodiments the memory controller 104 and/or the memory 106 may be a part of the device 102.

The device 102 may include any apparatus that requests information stored on the memory 106. The device 102 may include a compute device, such as may include a smart phone, tablet, laptop, desktop computer, television, camera, vehicle, base station, other communication device, or the like. As previously discussed, the memory controller 104 and/or the memory 106 may be remote to the device 102 (e.g., on a different network than the device 102), on a same network as the device 102, or part of the device 102.

The device 102 may issue a request 112 to the memory controller 104. The request may be to write data (sometimes called information) to or read data from the memory 106. The memory controller 104 may be a part of the memory 106 in one or more embodiments. The memory controller 104 manages read and write requests for information from the memory 106. The memory controller 104 may perform access control operations to determine whether the device 102 issuing a request has sufficient permissions to access/write to the memory 106.

The memory 106 as illustrated includes processing circuitry 108 and row and column markers 124. The processing circuitry 108 as illustrated includes data obfuscation circuitry 110. The processing circuitry 108 as illustrated further includes one or more latches 116. The memory 106 may include a volatile or non-volatile memory portion. A volatile memory is a data storage device that maintains data while the device is powered on (and in some cases for a short period of time after the memory is powered off and charge to and from the memory dissipates). Most random access memory (RAM) devices are volatile memory devices. After power to a volatile memory is interrupted, the data stored thereon may be lost.

The memory 106 ("memory circuit") may include an individual memory die (e.g., a discrete memory device) or one or more memory devices operably coupled to one another, forming a memory module (for example, such as a dual in-line memory module (DIMM), a package of multiple stacked memory devices, etc.). In the memory circuit, error correcting code (ECC) circuitry may be provided on one or more of the discrete memory devices; may be provided on discrete die(s) associated with one or more of the memory devices, or may be provided on logic die(s) associated with one or more of the memory devices.

Non-volatile memory, in comparison, retains data through a power cycle. Examples of non-volatile memories include read-only memory (ROM), hard disks, optical disks, magnetic tape, holographic memory, and the like. Typically, non-volatile memory costs more, provides worse performance (in terms of read times, write times, and/or memory density (number of bits per unit area), power consumption, write endurance (number of times that the memory may be re-written before it no longer represents data stored thereon), or the like).

Sensitive data (data which a user does not want another one or more users to access) may be stored in memory. Even volatile memory such, as Dynamic RAM (DRAM), may retain information for up to a few minutes after power down. Non-volatile memory may retain information indefinitely, such as if no erase or overwrite operation is performed, or the memory otherwise remains functional. There have been reports of data theft by reading a volatile memory after a computer has powered down and before the information on the memory is lost.

The processing circuitry 108 may include one or more electric and/or electronic components (e.g., transistors, resistors, inductors, capacitors, diodes, switches, multiplexers, logic gates (e.g., AND, OR, NEGATE, or the like), oscillators, regulators (e.g., power, voltage, and/or current regulators), and/or processors, such as may be configured to execute instructions stored on a machine-readable medium (e.g., a portion of the memory 106), field programmable gate array (FPGA), application-specific integrated circuit (ASIC), or the like). The processing circuitry 108 may be configured as a state machine that performs a next operation based on a previous operation, an output, and/or an input.

At least a portion of the processing circuitry 108 may include data obfuscation circuitry 110. The data obfuscation circuitry 110 may alter data stored or to be stored on the memory 106, such as based on data stored in the one or more latches 116 or at a specified location in the memory 106. The data obfuscation circuitry 110, in one or more embodiments, flips one or more bits of data and/or an address and/or scrambles the data and/or address (e.g., with or without flipping one or more bits before or after the scrambling). An example of obfuscation circuitry that inverts one or more bits is provided in FIG. 3, and obfuscation circuitry that scrambles two or more bits is provided in FIG. 5.

The state of latches 116 form a data obfuscation key which may be used to recover the data stored in the memory 106. In response to the state of the latches 116 being reset by a reset function, the data stored in the memory 106, with sufficient obfuscation, becomes unrecoverable and no longer subject to unauthorized access. If the latches 116 are volatile latches, then the obfuscation key may be automatically erased upon power down and the security of sensitive information may be automatically assured without the need for an erase procedure.

The latch(es) 116 or location(s) at which the data indicating how to obfuscate the data/address is stored may be volatile or non-volatile. The latch(es) 116 as illustrated includes data 118 that is used as input to the processing circuitry 108, such as the data obfuscation circuitry 110. The data 118 of the latch(es) 116 may include select words 120A, 120B, 120C, 120D, and 120E, and an obfuscation flag 122. The select words 120A-120E may be used as input to a multiplexer (see FIGS. 3 and 5) or other circuitry, such as to indicate how to invert, scramble, or otherwise alter the data or address to be obfuscated. The obfuscation flag 122 indicates whether data before, at, and/or after row and column markers 124 is obfuscated or un-obfuscated. For example, if the obfuscation flag is set to logical "1" or logical "0", the data in the memory 106 at and/or after the entry in the memory 106 to which the row and column markers 124 point may be obfuscated or un-obfuscated.

The row and column markers 124 include data sufficient to indicate a next entry in the memory 106 to be altered by the data obfuscation circuitry 110 or a most recently entry in the memory 106 that was altered by the data obfuscation circuitry 110. In either case, the row and column markers 124 indicate which entry in the memory 106 is be obfuscated next. The combination of the row and column markers 124 and the obfuscation flag 122 indicate which entries in the memory 106 are obfuscated and which entries in the memory 106 are un-obfuscated. More details regarding the indication of which entries in the memory 106 are obfuscated/un-obfuscated are discussed with regard to FIGS. 2-3.

In one or more embodiments, the data obfuscation circuitry 110 may include Error Correcting (EC) circuitry 126. An ECC memory (a memory with error correcting code (ECC) circuitry) may be used where data corruption may not be tolerated or is otherwise detrimental (e.g., scientific, financial, or other applications). The EC circuitry 126 may detect and correct errors made in reading and/or writing a memory entry. Errors in the memory 106 may be from electrical or magnetic interference in and/or around the memory causing one or more bits of a memory to flip to an opposite (e.g., from a logical "1" to a logical "0" or vice versa) or some other state. The errors may be induced by interfering with the memory itself or the circuitry used to read or write to the memory. The EC circuitry 126 may help prevent compute device (e.g., the device 102) crashes and/or corruption of data.

The EC circuitry 126 may add one or more bits to information of an entry, which may be stored with the information or may be used to encode the information. There are a variety of ECC schemes, including automatic repeat request (ARQ) ECC schemes and forward error correction (FEC) schemes. An ARQ scheme includes a receiving device (the memory 106, memory controller 104, or other device 102) performing a check to determine whether appended bits or encoding is consistent. If the check fails, the receiving device may request re-transmission of the information. In an FEC ECC scheme data is encoded using the ECC prior to transmission. The added information is used by the receiver to recover the original data.

Error detection schemes may include repetition codes, parity bits, checksums, cyclic redundancy checks (CRC), a cryptographic hash function, and/or ECC. Error correction may include ARQ, ECC, and/or a hybrid scheme. Types of ECC may include convolutional codes or block codes. Convolutional codes are processed on a bit-by-bit basis. Block codes are processed on a block-by-block basis. Examples of block codes are repetition codes, Hamming codes, multidimensional parity-check codes, Reed-Solomon codes, turbo codes, and low-density parity-check codes. Some memories use CRC for detection and Reed-Solomon codes to correct errors. Some other memories using Hamming codes or triple modular redundancy.

The processing circuitry 108 may perform scrubbing operations on the memory 106, such as to detect one or more errors in writing the data to the memory 106 and/or one or more errors introduced after the data is written to the memory 106. Scrubbing data regularly may be a beneficial practice to ensuring data on a memory is not corrupt. Scrubbing may include reading data, checking data for one or more errors, correcting the one or more errors (if any), and writing back the correct data. Data obfuscation may (automatically) be performed as part of a scrub routine. In one or more embodiments, data obfuscation may include inverting at least a portion of the data. A data obfuscation indicator (a combination of the obfuscation flag 122 and the row and column markers 124) may track which data is inverted. The data obfuscation indicator may be reset at power up/down.

The select words 120A-120E, obfuscation flag 122, and/or row and column markers 124 may provide a data obfuscation key. Data obfuscated without the obfuscation key may be unrecoverable. Data may be unrecoverable, such as by changing the obfuscation key (e.g., the select words 120A-120E). The data obfuscation key may be reset at power up/down.

The EC circuitry 126 may correct data or invert one or more bits of the data where an error is determined exist. To support the inversion operation, the EC circuitry 110 may include data invert circuitry (e.g., a NEGATE gate) and/or a multiplexer for every bit of an entry (see FIG. 3) (e.g., a memory that includes thirty-two bit entries may include thirty-two invert circuits, one for each bit)). During scrubbing, for example, the EC circuitry 126 may read the data from the memory 106, invert bits of the data determined to be in error, then write the data back to the memory 106 in corrected form.

Alternatively, during a scrub operation, data may be read from memory, one or more bits determined to be correct may be inverted, as indicated by the data obfuscation key, and the data may be written back to the memory 106 as corrected, obfuscated data. A bit that is determined to be incorrect and is indicated by the data obfuscation key to be inverted, may be left incorrect.

With such an obfuscated data implementation, at least some of the data read from the memory 106 may be obfuscated. The data obfuscation circuitry 110 may determine whether there is an error, re-invert the bits determined to be correct and previously inverted, and write the data back to the memory 106 or provide the data in response to a read request, such as to undo a previous invert operation. Current memories that do not include ECC circuitry may add data obfuscation circuitry 110, such as for a modest cost relative to the cost of the memory 106. Such EC circuitry may be located on a separate semiconductor device associated to provide ECC functionality to one or more memory devices.

To help ensure accuracy of data of the memory 106, data may be scrubbed during a refresh. The rate of the scrubbing may be one or more prefetches per full array refresh or other rate. An example DRAM specification requires about eight thousand refresh commands every sixty-four milliseconds. Assume the DRAM may accept six column addresses and ECC may correct one prefetch worth of data. A marker may be set at a row and column of an address to be scrubbed next. Each time the marker is accessed, such as in a refresh, read, scrub, and/or write, the next address (as indicated by the marker) may be scrubbed and/or obfuscated. In response to completion of the scrubbing and/or obfuscation, the marker may be incremented.

The row and column markers 124 may be lost after power down or erase. Information with an address at or greater than the marker (in this example) may be un-obfuscated and data with an address at or less than the marker (in this example) may include one or more complement bits. A complement bit is a bit that is opposite value (e.g., opposite of a logical "1" is a logical "0" and vice versa). After all addresses to be obfuscated have been obfuscated, the marker(s) may be reset to the beginning address of the memory 106 to be scrubbed and/or obfuscated. After the marker(s) have returned to a beginning address, the data in the memory may be un-obfuscated, such as by performing, by the data obfuscation circuitry 110, one or more operations that reverse the prior obfuscation operations.

As previously discussed, the bits to be inverted in each entry of the memory 106 may be tracked in the latch(es) 116. The data in the latch(es) 116, may be lost after power down of the memory 106. Loss of the marker 124 and/or definition of obfuscation (e.g., the data 118 in the latch(es) 116) may render the data unusable. In the preceding example, and for an example prefetch of 512 kB memory, it would take about 9.3 hours for all of the data to be inverted based on the inversion definition. For such an example prefetch, each entry about sixty-four bits (e.g., sixty-four columns and eight thousand rows). One prefetch may be inverted every sixty-four milliseconds (per the specification of the memory: 512,000*64 ms=33,500 seconds; 33,500 seconds*3600 seconds/hour=9.3 hours). In this example, about every 9.3 hours the definition of obfuscation in the latch(es) 116 may change or the definition of obfuscation may be defined in a different latch of the latch(es) 116.

Embodiments discussed herein may automatically (e.g., without human interference after deployment) help protect information on the memory 106, such as even after loss of power, erase operation, or the like. Using one or more embodiments, data on the memory 106 may be effectively erased (unusable) in response to loss of power, or reception of an information reset command (e.g., an erase command).

Another method of data/address obfuscation may include scrambling one or more bits of the data and/or address. Scrambling is discussed further with regard to FIGS. 4-5.

Figure 2:
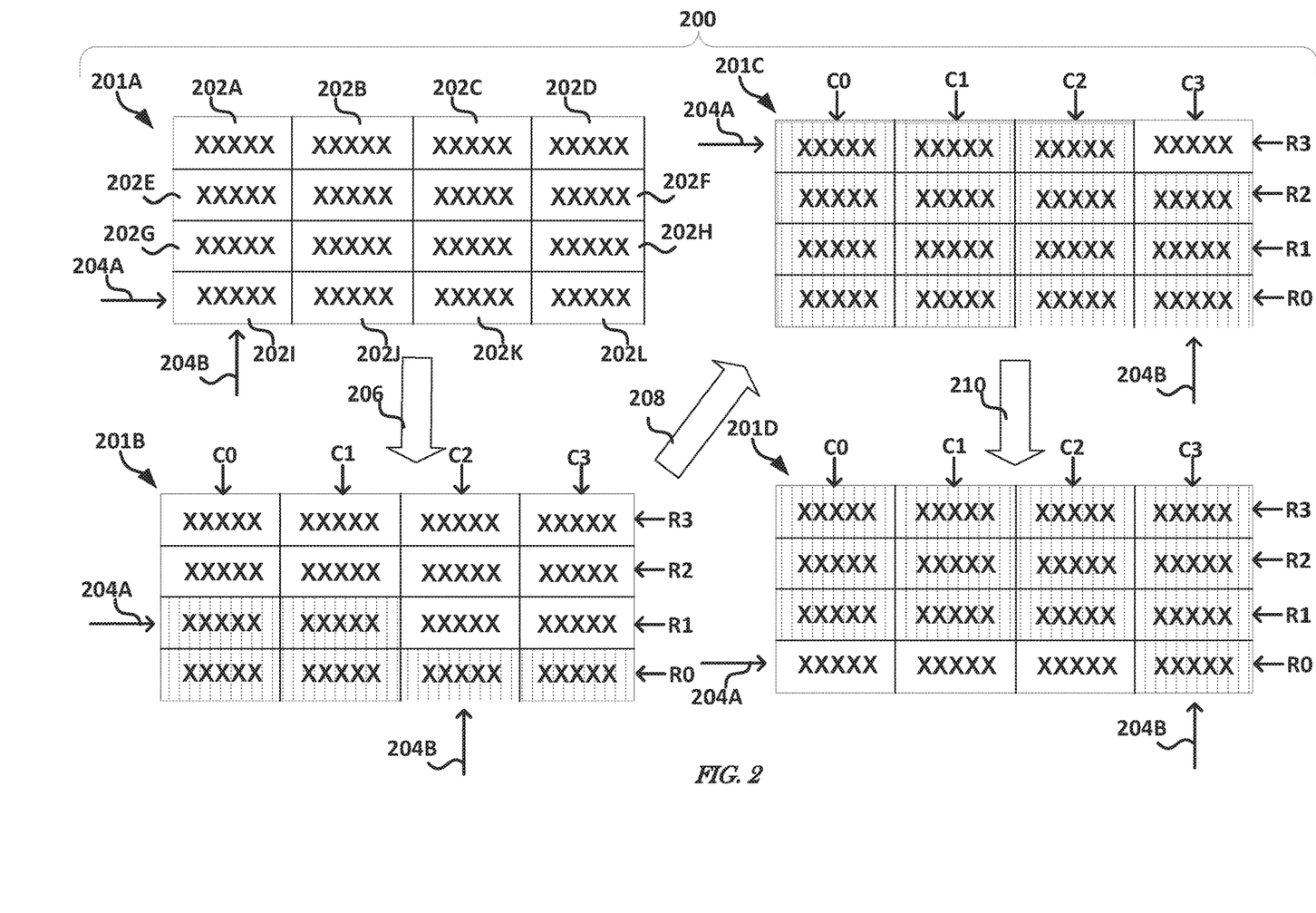
FIG. 2 illustrates, by way of example, exploded view diagrams of stages of the memory during a data obfuscation process.

FIG. 2 illustrates, by way of example, exploded view diagrams of stages 200 of a storage portion 201A, 201B, 201C, and 201D of the memory 106 during a data obfuscation process. The memory 106 in the example of FIG. 2 includes sixteen entries, each with five bits of data. The stages 200 include the storage portion 201A at a first time, the storage portion 201B at a second time, the storage portion 201C at a third time, and the storage portion 201D. The storage portions 201A-201D are examples of states of entries 202A, 202B, 202C, 202D, 202E, 202F, 202G, 202H, 202I, 202J, 202K, and 202L (not all entries include a reference number so as to not obscure the view in the FIG. 2). The storage portion 201A includes all entries 202A-L in an un-obfuscated state, as is indicated by a lack of cross-hatching and stippling on each of the entries 202A-L. A row marker 204A is set at row zero (R0, see stages 200B-200D) and a column marker 204B is set at column zero (C0, see stages 200B-200D). A next time an obfuscation operation is to be performed, the markers 204A-204B indicate which entry is to be obfuscated. In the example of the stage 200A, the entry 202I is the next entry to be obfuscated. The markers 204A-204B are a specific embodiment of the row and column markers 124.

The storage portion 201B exists sometime after the storage portion 201A, as indicated by arrow 206. The stage 200B illustrates the memory 106 after six data obfuscation operations have been performed. The cross-hatched entries indicate that the data has been obfuscated, while no cross-hatch indicates un-obfuscated data. After six obfuscation operations, the markers 204A-204B point to row one (R1) and column two (C2), respectively. Each of the entries at or after the markers 204A-204B are un-obfuscated, while each of the entries before the markers 204A-204B are obfuscated.

The markers 204A-204B may be updated by the processing circuitry 108, such as the data obfuscation circuitry 110. Updating the marker 204A may include incrementing the marker 204A in response to resetting the marker 204B to a default value (e.g., zero) unless the marker 204B points to a last column (e.g., C3 in this example) and the marker 204A points to a last row (e.g., R3 in this example), in which case the markers 204A-204B may both be reset to a default value. Updating the marker 204B may include performing an increment operation on the marker 204B unless the marker 204B points to a last column of data, in which case the marker 204B may be reset to the default value.

The storage portion 201C occurs sometime after the storage portion 201B, as indicated by arrow 208. The storage portion 201C illustrates a portion of the memory 106 after fifteen data obfuscation operations have been performed. After fifteen data obfuscation operations, the markers 204A-204B point to row three (R3) and column three (C3), respectively. Each of the entries at or after the markers 204A-204B are un-obfuscated, while each of the entries before the markers 204A-204B are obfuscated. After one more data obfuscation operation, the markers 204A-204B may be reset to a default value (e.g., to point to R0 and C0, respectively).

The storage portion 201D occurs sometime after the storage portion 201C, as indicated by arrow 210. The storage portion 201D illustrates a portion of the memory 106 after nineteen data obfuscation operations have been performed. After nineteen data obfuscation operations, the markers 204A-204B point to row zero (R0) and column three (C3), respectively. Each of the entries at or after the markers 204A-204B are obfuscated, while each of the entries before the markers 204A-204B are un-obfuscated. This storage portion 201D illustrates the reversal effect of inverting bits that were previously inverted.

Data (e.g., a bit or bits, such as the obfuscation flag 122) in the latch(es) 116 or elsewhere in the memory 106 may indicate whether data before, at, and/or after the position of the markers 204A-204B is obfuscated or un-obfuscated. For example, a "1" may indicate that the data at and after the markers 204A-204B is un-obfuscated (with data before the markers 204A-204B being obfuscated), while a "0" may indicate that the data at and after the markers 204A-204B is obfuscated (with data before the markers 204A-204B being un-obfuscated). In such embodiments, there is a special case where the markers point to zero positions (R0 and C0). In such a case, the one or more bits in the latch(es) 116 or the memory 106 may indicate that all data is either obfuscated or un-obfuscated. The one or more bits that indicate whether data at, before, and/or after the markers 204A-204B is sometimes called the obfuscation flag 122.

Figure 3:
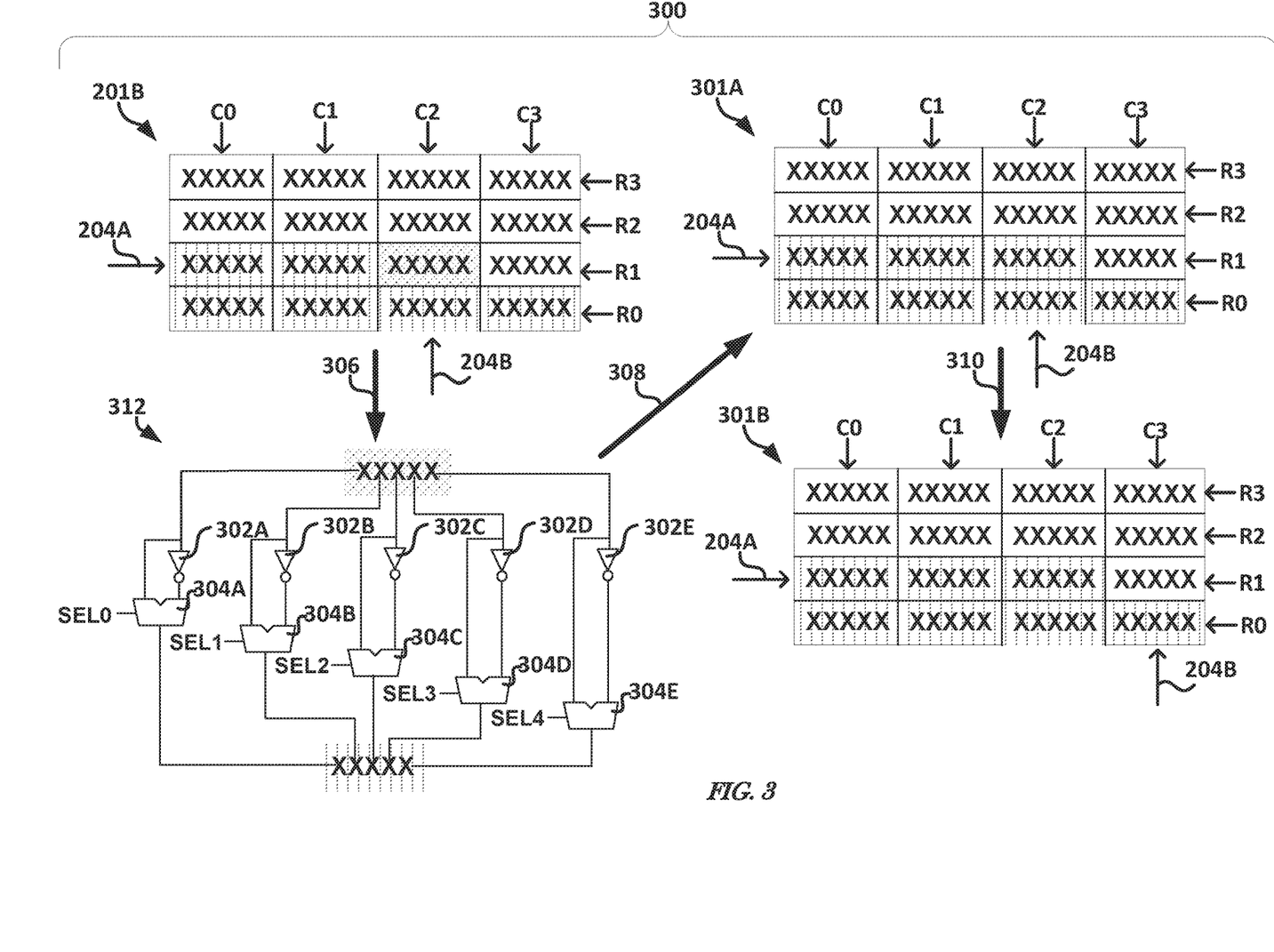
FIG. 3 illustrates, by way of example, exploded view diagrams of stages and circuitry of the memory during operations of a data obfuscation process.

FIG. 3 illustrates, by way of example, exploded view diagrams of the storage portion (e.g., storage portion 201B, 301A, and 301B) and circuitry 312 of the memory 106 during operations of a data obfuscation process. The storage portion 201B is the same as the storage portion 201B in FIG. 2 with the data stippled at row one (R1), column two (C2) indicating that data is next to be operated on, the data cross-hatched indicating that data is obfuscated, and the non-cross-hatched and non-stippled data indicating that data is un-obfuscated.

As indicated by arrow 306, the data is provided to invert circuitry 312, which may be a part of the processing circuitry 108, such as the data obfuscation circuitry 110. The data at [R1, C2] is provided to the data obfuscation circuitry 110. In this example, the data invert circuitry 312 includes multiplexers 304A, 304B, 304C, 304D, and 304E and negate gates 302A, 302B, 302C, 302D, and 302E for corresponding bits of the data in an entry. Each of the multiplexers 304A-304E as illustrated includes three inputs, two inputs from which to select to become the output, and a select input indicating which of the two inputs to select as the output. The select input may each include data from the latch(es) 116. For example, respective bits in the latch(es) 116 may correspond to selection bits "SEL0", "SEL1", "SEL2", "SEL3", and "SEL4", as illustrated in FIG. 1.

Storage portion 301A exists after the storage portion 201B, as indicated by arrow 308. Each of the bits of the data at [R1, C2] is either inverted or un-inverted as indicated by the select words and written to the storage portion 301A, as indicated by the cross-hatching at [R1, C2]. After, concurrently with, or before the storage portion 301A, storage portion 301B may exist. As illustrated, the storage portion 301B exists after the storage portion 301A, as indicated by arrow 310. The storage portion 301B, includes updated markers 204A-204B. The markers 204A-204B may be updated to point to next data to be obfuscated or un-obfuscated (obfuscated in this example).

Figure 4:
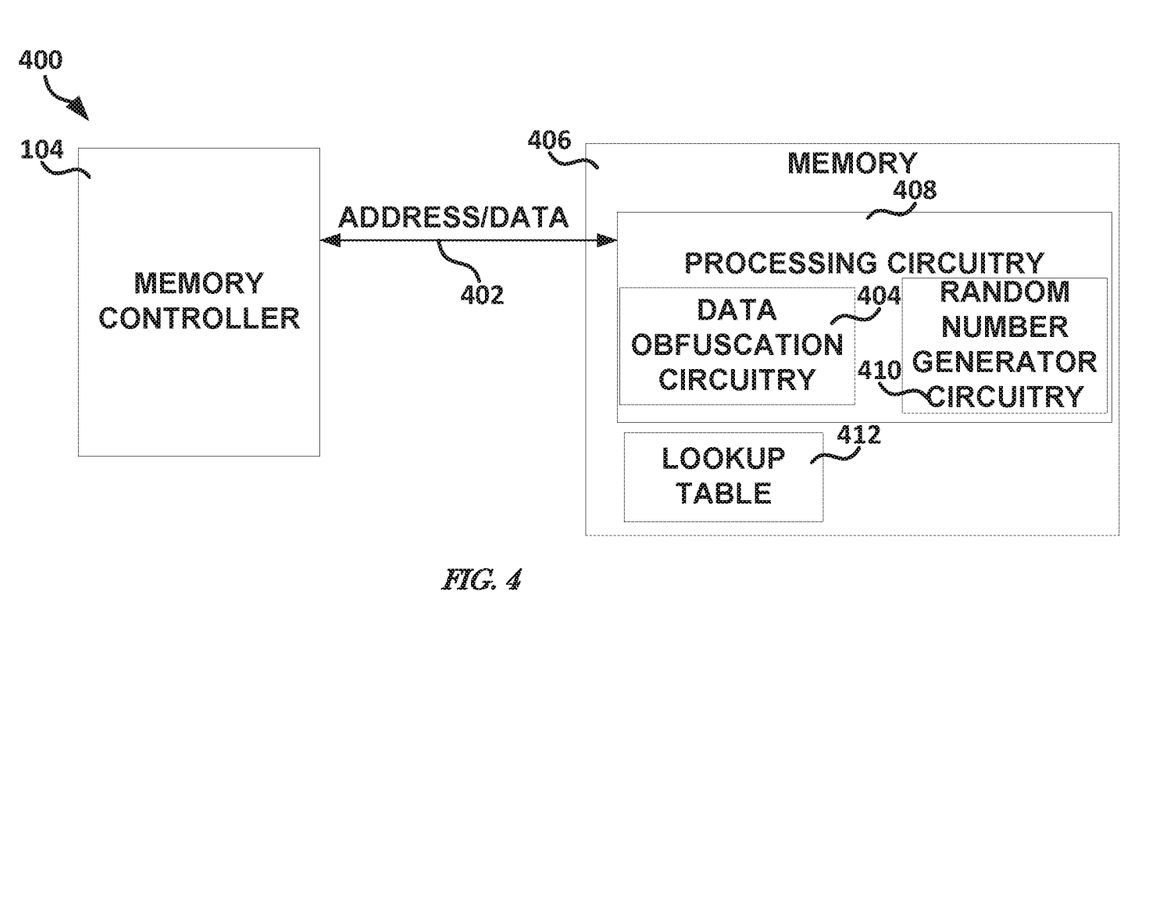
FIG. 4 illustrates, by way of example, another embodiment of an in-memory data obfuscation system.

FIG. 4 illustrates, by way of example, another embodiment of an in-memory data obfuscation system 400. The system 400 as illustrated includes the memory controller 104 and a memory 406 communicatively coupled as indicated by arrow 402. The memory 406 is similar to the memory 106 with the memory 406 including the processing circuitry 408 and a lookup table 412. The processing circuitry 408 may include one more of the same electric and/or electronic components as the processing circuitry 108.

The processing circuitry 408 is configured to scramble two or more bits of the address and/or data to be written to the storage portion of the memory 406. The data obfuscation circuitry 404 is similar to the data obfuscation circuitry 110 with data obfuscation circuitry 404 configured to obfuscate data by scrambling the data and/or an address to which the data is written, instead of inverting one or more bits of the data to obfuscate data. The scrambling performed by the data obfuscation circuitry 404 may include swapping bits within the same data and/or address word. For example, swapping may include swapping bits two and three (e.g., [01010] after swapping bits two and three becomes [01100]). The data obfuscation circuitry 404 may include a switch network or a series of multiplexers (such network is presented in FIG. 5).

Figure 5:
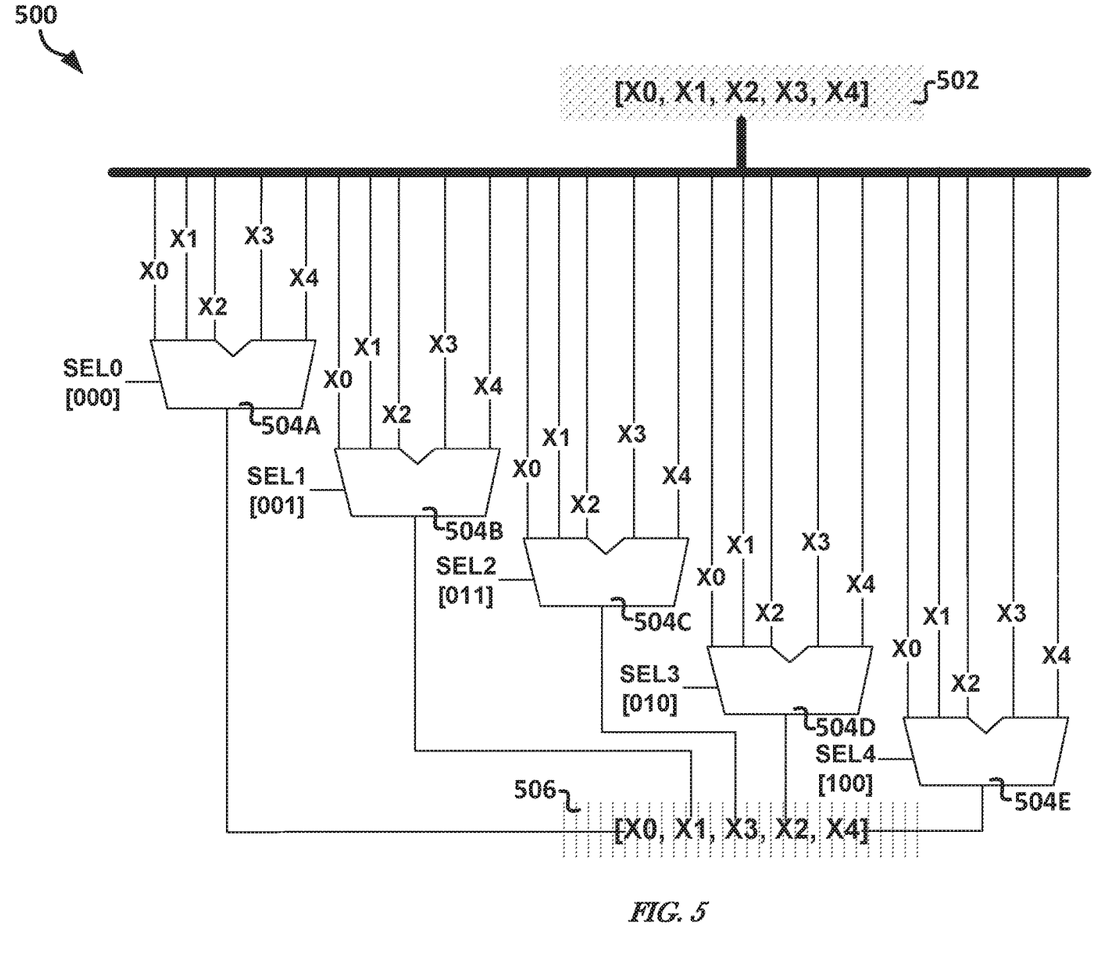
FIG. 5 illustrates, by way of example, a diagram of an embodiment of a scrambler circuitry system.

FIG. 5 illustrates, by way of example, a diagram of an embodiment of a scrambler circuitry system 500. The system 500 as illustrated includes data input 502, multiplexers 504A, 504B, 504C, 504D, and 504E, and scrambled data output 506. Each of the multiplexers 504A-504E includes each of the bits of the data 502 on individual input lines. The select words "SEL0", "SEL1", "SEL2", "SEL3", and "SEL4" each indicate which of the input bits is to be output by the corresponding multiplexer 504A-504E. The data output 506 is a scrambled or un-scrambled version of the data input 502.

In one or more embodiments, the processing circuitry 408 may include random number generator circuitry 410 that produces a random number based on a seed value. The generated random number may be hashed, by the processing circuitry 408 to within a range of indexes of a lookup table 412. Each of the entries in the lookup table 412 may correspond to a scrambling of the data input 502, such as by indicating values for each of the select words. In the embodiment of FIG. 5, each of the select words may include three or more bits, such as to indicate a bit between zero and four, but may include fewer or more bits in other embodiments, such as the embodiment illustrated in FIG. 3. Using the circuitry of the system 500, any bit in data may be swapped for any other bit of the data. The random number may be a key (e.g., a portion of a key) used for data obfuscation and may be lost on reset or power down rendering data secure, such as when it is no longer needed by legitimate users.

Figure 6:
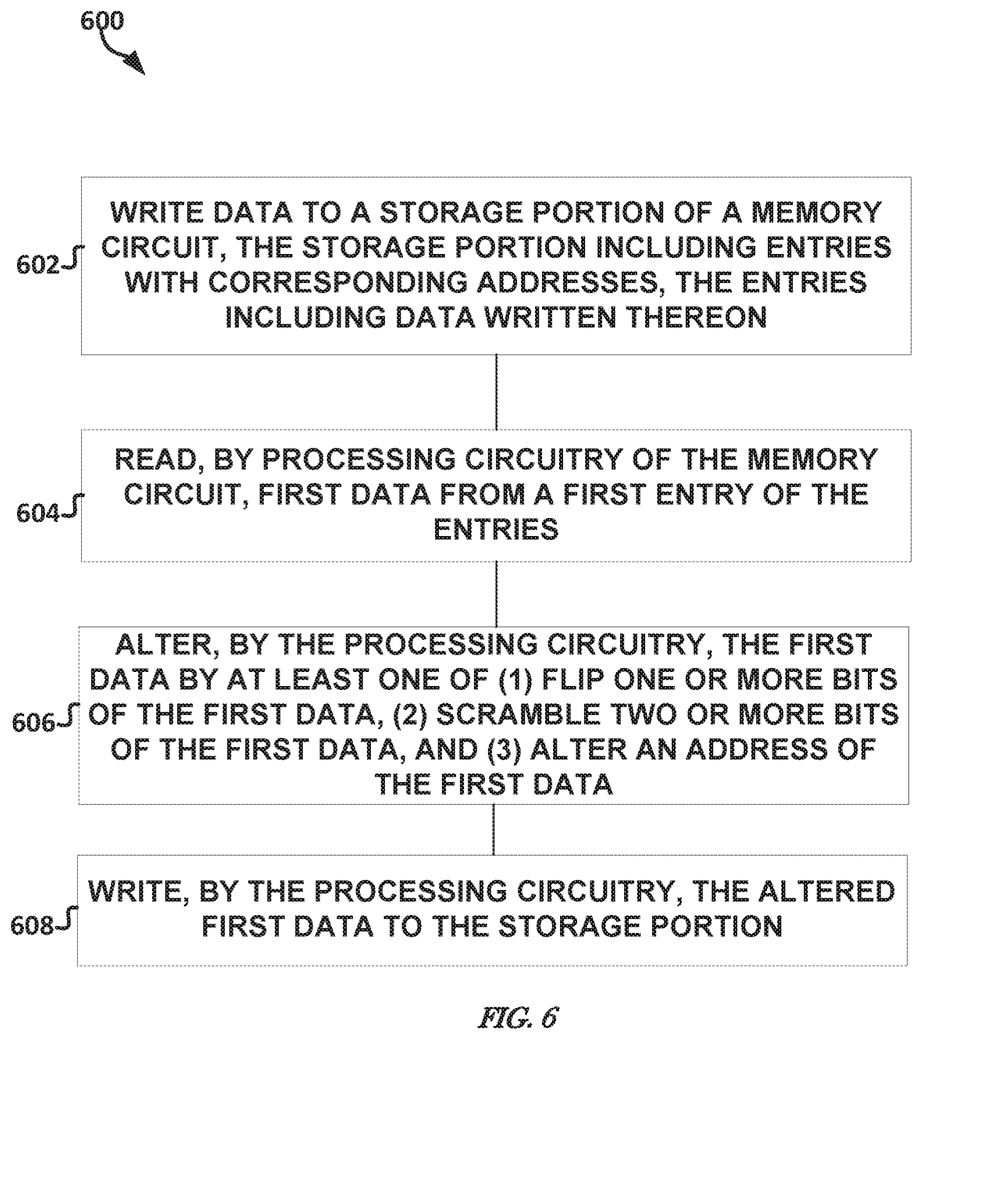
FIG. 6 illustrates, by way of example, a diagram of an embodiment of a method for in-memory data obfuscation.

FIG. 6 illustrates, by way of example, a diagram of an embodiment of a method 600 for in-memory data obfuscation. The method 600 includes a method of using a memory device, such as the memory 106 or 406. The method 600 may be performed, at least in part, by the processing circuitry 408 or 108. The method 600, as illustrated, includes: writing data to a storage portion of the memory device, the storage portion including entries with corresponding addresses, the entries including data written thereon; at operation 602; reading, by processing circuitry of the memory device, first data from a first entry of the entries, at operation 604; altering, by the processing circuitry, the first data by at least one of: (1) flipping one or more bits of the first data, (2) scrambling two or more bits of the first data, and (3) altering an address of the first data, at operation 606; and writing, by the processing circuitry, the altered first data to the storage portion, at operation 608.

The operation 606 may include flipping one or more bits of the first data or scrambling two or more bits of the first data. The operation 606 may include flipping the one or more bits of the first data based on data stored on a latch of the processing circuitry, the data on the latch indicating which of the one or more bits is to be flipped. The latch may be a volatile storage latch that loses the stored thereon in response to a reset or loss of power.

The method 600 may further include correcting, using error correction circuitry of the processing circuitry and prior to alteration of the first data, a detected error in the first data. The processing circuitry may include a multiplexer for each bit of the first data, the multiplexer including a first input, a second input, and a select input, the first input electrically coupled to an un-modified version of a corresponding bit and the second input electrically coupled to a flipped version of the corresponding bit, and the select input electrically coupled to a bit of data from the latch that indicates whether the corresponding bit is to be flipped.

The method 600 may further include correcting, using error correction circuitry of the processing circuitry and prior to operation 606, a detected error in the first data only if the error does not correspond to a bit to be flipped as indicated by the data stored on the latch. The storage portion may include a lookup table including respective entries indicating how the bits of the first data are to be scrambled. The method 600 may further include generating, using a random number generator of the processing circuitry a random number that points to an entry in the lookup table. The operation 606 may include scrambling the bits of the first data based on the entry in the lookup table to which the random number points. The storage portion may be volatile.

The method 600 may further include performing, using the processing circuitry, a periodic data refresh operation on one or more entries of the storage portion. The operations 602, 604, and 606 may occur at or around the time of the periodic data refresh. The method 600 may further include scrambling an address corresponding to the first entry, and the operation 608 may include writing the first data to the scrambled address.

Any of the circuitry (e.g., the processing circuitry 108, 408, data obfuscation circuitry 110, 404, EC circuitry 126, or the like) may include one or more electric and/or electronic components, such as discussed with regard to the processing circuitry 108.

The memory 106 or 406 may include a machine-readable medium (data stored thereon) that includes instructions. The instructions, when executed by a machine (e.g., the processing circuitry 108 or 408 or other machine capable of executing such instructions), cause the machine to perform operations of the method 600.

The above description and the drawings illustrate some embodiments of the invention to enable those skilled in the art to practice the embodiments of the invention. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description.

What is claimed is:

1. A memory structure comprising:
a storage portion including data entries with corresponding addresses stored in a first area of the memory structure and obfuscation data stored in a second area of the memory structure, the obfuscation data including multiple selection bits and an obfuscation flag; and
processing circuitry including one or more processors, the processing circuitry configured to:
select a first data entry of the data entries, based on the obfuscation flag within the obfuscation data;
read first data from the first data entry of the data entries, the first data comprising a number of bits;
alter a first portion of the number of bits of the first data using the multiple selection bits in the obfuscation data to generate altered first data, the multiple selection bits stored in the second area of the memory structure indicating which of the number of bits the first data stored in the first area of the memory structure will be altered;
correct a detected error in the first data, the detected error being at a second portion of the number of bits of the first data, the first portion of the number of bits and the second portion of the number of bits not having any bits in common not; and
after altering the first portion of the number of bits and correcting the detected error, write the first data to the storage portion.

2. The memory structure of claim 1, wherein the storage portion further includes a marker indicating a memory location of the first data entry, and wherein the obfuscation flag indicates whether data located at, before, or after the memory location is altered or unaltered.

3. The memory structure of claim 1, wherein alteration of the first data includes the processing circuitry to flip the one or more bits of the first data and the processing circuitry includes a latch with the obfuscation data stored thereon, the multiple selection bits within the obfuscation data indicating which bit of the one or more bits is to be flipped.

4. The memory structure of claim 3, wherein the latch is a volatile storage latch that loses the obfuscation data stored thereon in response to a reset or power down.

5. The memory structure of claim 3, wherein the correcting of the detected error is prior to the alteration of the first data.

6. The memory structure of claim 5, wherein the processing circuitry includes a multiplexer for each bit of the first data, the multiplexer including a first input, a second input, and a select input, the first input electrically coupled to an un-modified version of a corresponding bit and the second input electrically coupled to a flipped version of the corresponding bit, and the select input electrically coupled to a bit of the selection bits in the obfuscation data from the latch that indicates whether the corresponding bit is to be flipped.

7. The memory structure of claim 1, wherein the processing circuitry further includes error correction circuitry and is also configured to, prior to alteration of the one or more bits of the first data, determine that the detected error does not correspond to a bit to be flipped as indicated by the obfuscation data.

8. The memory structure of claim 2, wherein:
the storage portion includes a lookup table including respective entries indicating how the one or more bits of the first data are to be altered;
the processing circuitry further includes random number generator circuitry to produce a random number that points to an entry in the lookup table; and
alteration of the one or more bits of the first data includes the processing circuitry further to scramble the one or more bits of the first data based on the entry in the lookup table to which the random number points.

9. The memory structure of claim 1, wherein the storage portion is volatile.

10. The memory structure of claim 9, wherein the processing circuitry is further configured to:
perform a periodic data refresh operation on one or more entries of the storage portion; and
read the first data from the first data entry, alter the first data, and write the altered first data to the first data entry at or around a time of the periodic data refresh.

11. The memory structure of claim 1, wherein the processing circuitry is further to:
scramble an address corresponding to the first data entry to generate a scrambled address; and
write the first data to the scrambled address.

12. A method of operating a memory device, the method comprising:

writing data to a storage portion of the memory device, the storage portion including data entries with corresponding addresses stored in a first area of the memory device and obfuscation data stored in a second area of the memory device, the obfuscation data including multiple selection bits and an obfuscation flag;

selecting, by processing circuitry of the memory device, a first data entry of the data entries, based on the obfuscation flag within the obfuscation data;

reading, by the processing circuitry, first data from the first data entry of the data entries, the first data comprising a number of bits;

altering, by the processing circuitry, a first portion of the number of bits of the first data using the multiple selection bits in the obfuscation data, to generate altered first data, the multiple selection bits stored in the second area of the memory device indicating which of the number of bits of the first data stored in the first area of the memory device will be altered;

correcting a detected error in the first data, the detected error being at a second portion of the number of bits of the first data, the first portion of the number of bits and the second portion of the number of bits not having any bits in common; and after altering the first portion of the number of bits and correcting the detected error, writing, by the processing circuitry, the first data to the storage portion.

13. The method of claim 12, wherein the storage portion further includes a marker indicating a memory location of the first data entry, and wherein the obfuscation flag indicates whether data located at, before, or after the memory' location is altered or unaltered.

14. The method of claim 12, wherein:
the obfuscation data is stored on a latch of the processing circuitry and altering the first data includes flipping the one or more bits of the first data based on the selection bits in the obfuscation data, the multiple selection bits in the obfuscation data indicating which bit of the one or more bits is to be flipped.

15. The method of claim 14, wherein the latch is a volatile storage latch that loses the data stored thereon in response to a reset or loss of power.

16. The method of claim 12, wherein the correcting of the detected error is prior to the alteration of the first data.

17. A non-transitory machine-readable medium including instructions that, when executed by a machine, cause the machine to perform operations comprising:
writing data to a storage portion of a memory device, the storage portion including data entries with corresponding addresses stored in a first area of the memory device and obfuscation data stored in a second area of the memory device, the obfuscation data including multiple selection bits and an obfuscation flag;

selecting a first data entry of the data entries, based on the obfuscation flag within the obfuscation data;

reading first data from the first data entry of the data entries;

altering the first data using the multiple selection bits to create altered first data, the altering comprising at least one of: (1) flipping one or more bits of the first data, (2) scrambling two or more bits of the first data, and (3) altering an address of the first data, the multiple selection bits stored in the second area of the memory device indicating which of the one or more bits of the first data stored in the first area of the memory device will be altered;

correcting a detected error in the first data, the detected error not being at a bit of the first data that is altered using the multiple selection bits in the obfuscation data; and writing the altered first data to the storage portion.

18. The non-transitory machine-readable medium of claim 17, wherein:
the obfuscation data is stored on a latch of the memory device;

altering the first data includes flipping one or more bits of the first data based on the multiple selection bits in the obfuscation data, the selection bits indicating which of the one or more bits is to be flipped;

the correcting of the detected error is prior to alteration of the first data; and the machine includes a multiplexer for each bit of the first data, the multiplexer including a first input, a second input, and a select input, the first input electrically coupled to an un-modified version of a corresponding bit and the second input electrically coupled to a flipped version of the corresponding bit, and the select input electrically coupled to a bit of the multiple selection bits in the obfuscation data from the latch that, indicates whether the corresponding bit is to be flipped.

19. The non-transitory machine-readable medium of claim 18, the operations further comprising prior to the alteration of the first data, determine that the detected error does not correspond to a bit to be flipped as indicated by the multiple selection bits in the obfuscation data.

20. The non-transitory machine-readable medium of claim 17, wherein:
the storage portion includes a lookup table including respective entries indicating how the bits of the first data are to be scrambled;

the operations further comprise generating, using a random number generator of the memory device, a random number that points to an entry in the lookup table; and altering the first data includes scrambling the bits of the first data based on the entry in the lookup table to which the random number points.

21. The memory structure of claim 1, wherein the processing circuitry is further configured to:
alter the first data by flipping one or more bits of the first data using the multiple selection bits in the obfuscation data, to generate the altered first data.

22. The memory structure of claim 1, wherein the processing circuitry further configured to:
alter the first data by scrambling two or more bits of the first data using the multiple selection bits in the obfuscation data, to generate the altered first data.

23. The memory structure of claim 1, wherein the processing circuitry is further configured to:
alter the first data by altering an address of the first data using the multiple selection bits in the obfuscation data, to generate the altered first data.

24. The method of claim 12, further comprising:
altering, by the processing circuitry, the first data by at least one of the following:
flipping one or more bits of the first data, scrambling two or more bits of the first data, and altering an address of the first data using the multiple selection bits in the obfuscation data, to generate the altered first data.

25. The non-transitory machine-readable medium of claim 17, wherein executing the instructions causes the machine to perform operations comprising:
altering the first data by at least one of the following:

flipping one or more bits of the first data, scrambling two or more bits of the first data, and altering an address of the first data using the multiple selection bits in the obfuscation data, to generate the altered first data.

* * * * *